(12) United States Patent
Riser et al.

(10) Patent No.: US 7,839,304 B2
(45) Date of Patent: Nov. 23, 2010

(54) METHOD AND SYSTEM FOR ALERTING AIRCREW TO UNSAFE VIBRATION LEVELS

(75) Inventors: Robert Michael Riser, California, MD (US); Matthew Joseph Stepura, Hollywood, MD (US); Mark Andrew Long, Lusby, MD (US); Allen James Landers, Great Mills, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 358 days.

(21) Appl. No.: 12/113,387

(22) Filed: May 1, 2008

(65) Prior Publication Data

US 2009/0273488 A1 Nov. 5, 2009

(51) Int. Cl.
*G08B 23/00* (2006.01)

(52) U.S. Cl. .................. 340/963; 340/971; 340/946; 73/66; 244/208; 244/204; 244/207

(58) Field of Classification Search .............. 340/963, 340/971, 946; 73/66; 244/195, 99.1, 17.19, 244/17.15, 17.13, 17.21, 208, 204, 207; 701/3, 701/8

See application file for complete search history.

(56) References Cited

U.S. PATENT DOCUMENTS

| | | | | |
|---|---|---|---|---|
| 3,774,923 | A * | 11/1973 | Suroff | 280/601 |
| 3,938,762 | A * | 2/1976 | Murphy | 244/17.13 |
| 5,335,886 | A * | 8/1994 | Greenhalgh | 244/213 |
| 6,185,470 | B1 * | 2/2001 | Pado et al. | 700/104 |
| 6,608,568 | B1 * | 8/2003 | Ruchti | 340/946 |
| 7,032,860 | B1 * | 4/2006 | Kirk et al. | 244/17.19 |
| 7,567,862 | B2 * | 7/2009 | Pelton et al. | 701/33 |
| 2002/0117579 | A1 * | 8/2002 | Kotoulas et al. | 244/1 N |
| 2003/0094001 | A1 * | 5/2003 | Desai et al. | 60/791 |
| 2004/0060347 | A1 * | 4/2004 | Comperat et al. | 73/66 |
| 2006/0064210 | A1 * | 3/2006 | Aubourg | 701/3 |
| 2006/0077013 | A1 * | 4/2006 | Tsuruhara et al. | 331/74 |
| 2006/0097104 | A1 * | 5/2006 | Eglin | 244/17.11 |
| 2006/0237594 | A1 * | 10/2006 | Najmabadi et al. | 244/195 |
| 2007/0001052 | A1 * | 1/2007 | Strehlow et al. | 244/99.1 |

* cited by examiner

*Primary Examiner*—George A Bugg
*Assistant Examiner*—Hoi C Lau
(74) *Attorney, Agent, or Firm*—Mark D. Kelly; Mark O. Glut

(57) ABSTRACT

An onboard system for a rotary wing aircraft detects a limit cycle oscillation in the tail mast and provides a timely indication of the limit cycle oscillation to an aircrew before serious damage to the airframe is likely to occur.

11 Claims, 5 Drawing Sheets

METHOD AND SYSTEM FOR ALERTING AIRCREW TO UNSAFE VIBRATION LEVELS

GOVERNMENT INTEREST

The invention described herein may be manufactured, licensed, and used by or for the U.S. Government.

BACKGROUND

A rotary wing aircraft provides a complex vibratory environment. Vibrations emanate from many different sources including the main rotor, the tail rotor, gearboxes, linkages and engines. Vibrations will vary in intensity and frequency depending on the speeds and relative speeds of rotation of the main and tail rotors, load factors, structural deformation, resonances inherent in the airframe, and aerodynamic forces.

Vibrations cause premature failure of mechanical components such as gears and bearings, damage to avionics, flight instruments, fatigue to the airframe and discomfort to passengers and aircrew. Some underlying cause of vibrations include imbalances in rotating parts, uneven friction, meshing of gear teeth, parts that are dragging together, etc. Traditionally, helicopter vibrations have been managed or suppressed by balancing and alignment of rotating parts, reduction of friction, the use of vibration isolation mounts, installation of damping structures, absorption materials, and the like.

More recently, electronic systems have been devised to monitor and manage vibrations on rotary wing aircraft. Rotor track and balance systems such as the Rotor Analysis and Diagnostic System (RADS) have focused on providing information that can be used in flight to adjust pitch links, blade weights and trim tabs for smoother operation. Still other systems such as the Active Control of Structural Response system (ACSR) made by Agusta-Westland have been designed to reduce vibrations of the main rotor by active control systems that employ high-frequency force-actuation within the helicopter's structure. See, for example, U.S. Pat. No. 5,853,144.

Unfortunately, not all harmful vibrations have been mitigated by RADS, ACSR, or similar systems. One such vibration that is not mitigated by an ACSR or RADS type systems is referred to a limit cycle oscillation (LCO). In general, an LCO is defined as an oscillation of finite duration and finite amplitude which will return to a steady state value without additional external influences placed upon the system other than those found in the normal system environment. In some helicopters, such as the EH-101/AW-101, manufactured by Agusta-Westland, LCO's of a significant amplitude and duration have been detected in the vicinity of the tail rotor. These LCO events are unpredictable, occur only rarely and emanate far enough away from the cockpit that they have not been perceived by members of the aircrew until they have reached a magnitude that could cause damage to the aircraft.

In an effort to better understand LCO's in the EH-101/AW-101 and similar helicopters, vibration sensors have been placed in the vicinity of the tail rotor and the signals monitored either on the ground, via telemetry, or by an operator while in the air. Because LCO events have been extremely rare and have taken place under a variety of seemingly unrelated conditions, their causes are not yet well understood. However rare they may be, the consequences of LCOs are potentially catastrophic. Thus, the recommended course of action when a significant LCO is detected is to land the aircraft as soon as practicable, before damage to the airframe can occur. Tasking an aircrew member to monitor for LCO events is simply not practical. Thus, there is an immediate need for a system to detect and alert a helicopter aircrew to unsafe vibration levels from LCOs in the AH-101/AW-101 and similar rotary wing aircraft, before damage from an LCO can take place.

SUMMARY

In general, in one aspect, an embodiment of a system to detect a limit cycle oscillation event in a rotary wing aircraft according to the present invention includes a vibration sensor that outputs a signal to indicate vibration in the tail mast of the aircraft, a filter to limit the signal output from the sensor to a predetermined frequency range in which the limit cycle oscillation occurs and a switch to provide a first signal when the filtered signal output from the sensor exceeds a first predetermined amplitude for a predetermined duration.

In another aspect, an embodiment of a system to detect a limit cycle oscillation event in a rotary wing aircraft according to the present invention includes a second switch to provide a second signal after the first switch has provided the first signal and the filtered signal output from the sensor has exceeded a second predetermined amplitude greater than the first predetermined amplitude.

In yet another aspect, an embodiment of a system to detect a limit cycle oscillation event in a rotary wing aircraft according to the present invention includes a third switch to provide a third signal after the second switch has provided the second signal and the filtered signal output from the sensor has exceeded a third predetermined amplitude greater than the second predetermined amplitude.

BRIEF DESCRIPTION OF THE DRAWINGS

Embodiments according to the invention are illustrated in the accompanying drawings in which like reference numerals represent like parts throughout and in which.

DETAILED DESCRIPTION

In the following detailed description, reference is made to the accompanying drawings which are a part of this patent disclosure, and in which are shown by way of illustration specific embodiments in which the invention, as claimed, may be practiced. This invention may, however, be embodied in many different forms and should not be construed as limited to the embodiments set forth; rather, these embodiments are provided so that this disclosure will be thorough and complete, and will fully convey the scope of the invention to those skilled in the art.

Figure 1:
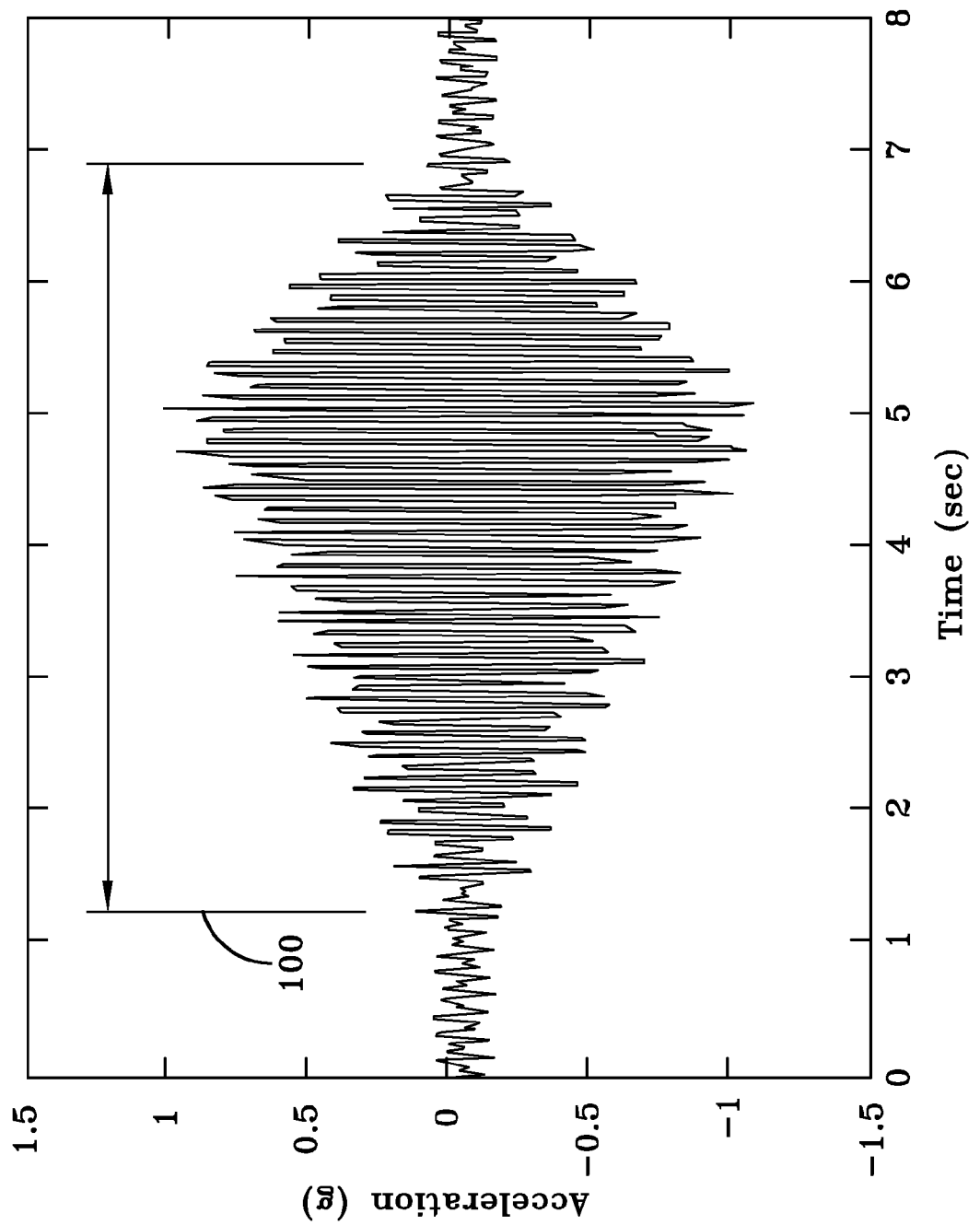
FIG. 1 shows an acceleration-time graph of an exemplary limit cycle oscillation in the context of the present invention.

FIG. 1 shows an acceleration-time graph that approximates a representative LCO event 100. An LCO event in the context of the present invention, such as might be experienced during operation of an EH-101/AW-101, is characterized generally by a vibration of the aircraft having a frequency in the range of 10-15 Hz, an acceleration of greater than 0.7 g's and a duration of more than 0.5 seconds. In this instance, LCO event 100 has occurred in the vicinity of the tail of the aircraft. It begins at approximately 1 second on the time scale (x-axis) and increases rapidly from about 0.2 g's to a peak acceleration of just under 1 g at second 5. LCO event 100 rapidly diminishes in magnitude so that by second 6.5 the event has ended. Overall, LCO event 100 persists for about 5 seconds. In general, LCO events may be longer or shorter than LCO event 100 but all share the same basic characteristics of having finite duration and finite amplitude and a return to a steady state value without additional external influences.

Figure 2:
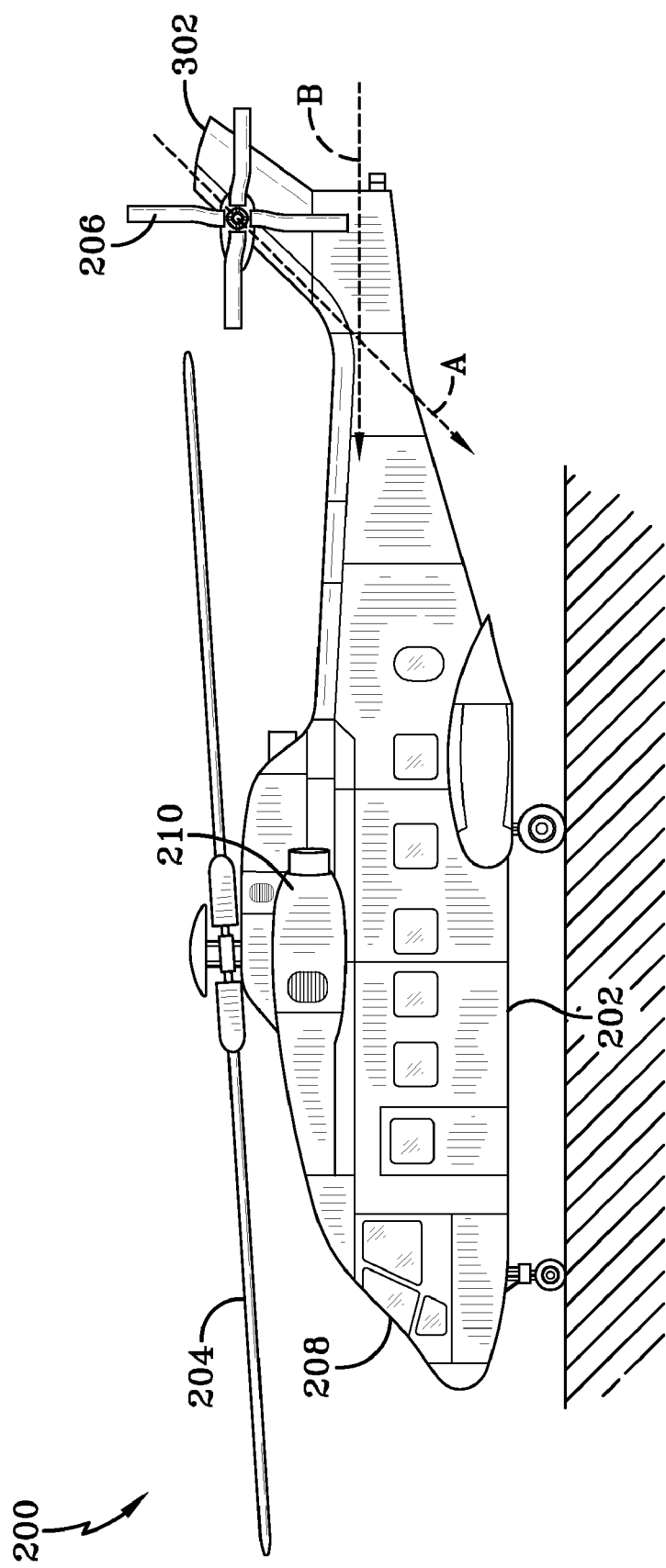
FIG. 2 shows an illustrative simplified side elevation of a helicopter that is equipped with an embodiment of a system for alerting an aircrew to unsafe vibration levels, according to the present invention according to the present invention.
Figure 3:
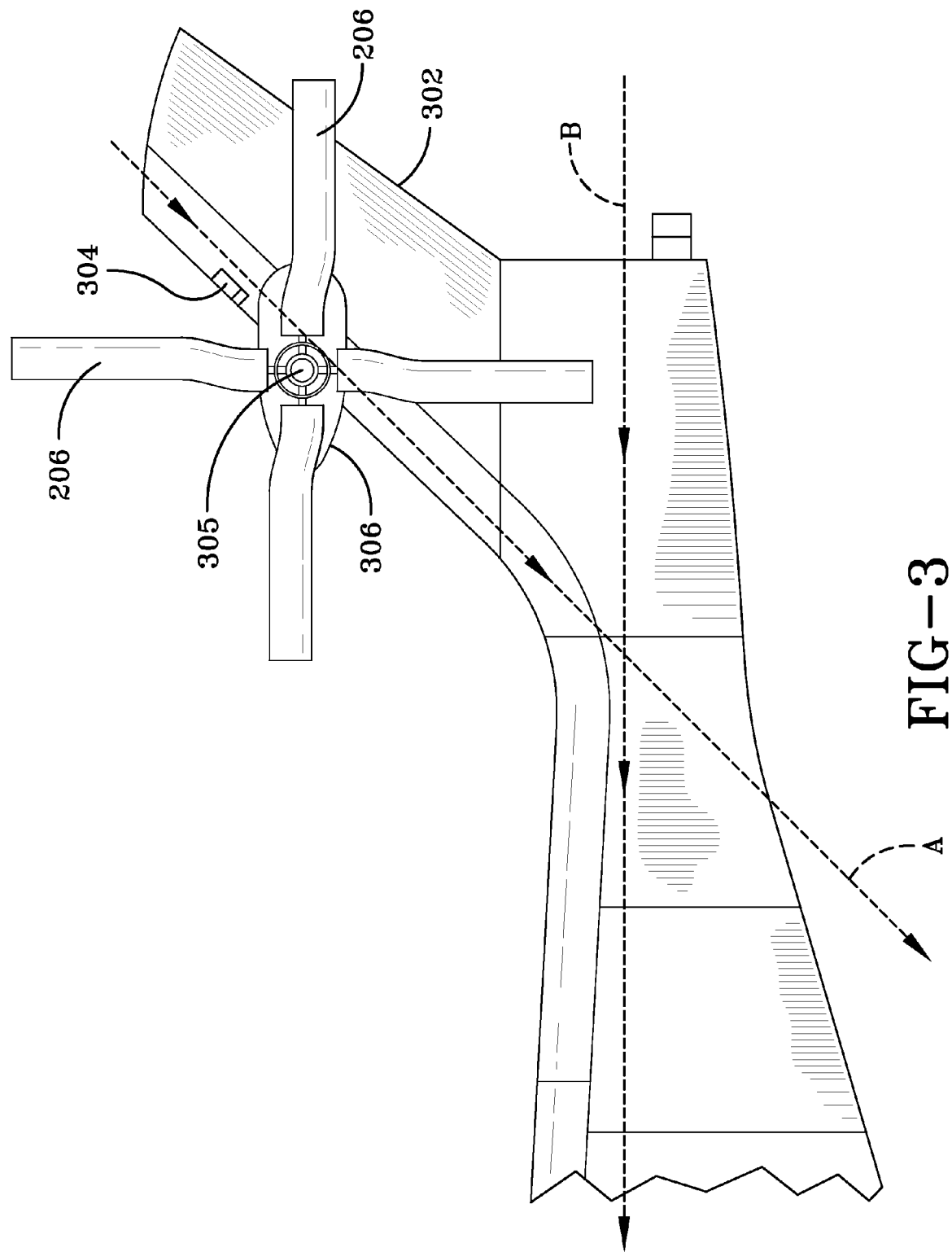
FIG. 3 shows a side elevation of the tail portion of the helicopter shown in FIG. 2.

FIG. 2 shows a simplified side elevation view of an EH-101/AW-101 rotary wing aircraft (helicopter) 200 having a fuselage 202, main rotor 204, tail rotor 206, tail fin 302 to which tail rotor 206 is mounted, cockpit 208 and turbines 210. As shown in FIG. 3, tail fin 302 includes a tail rotor gear box 306 from which a tail rotor shaft 305 extends for mounting tail rotor 206. The angular orientation and forward direction of the long axis of tail fin 302 is indicated by a dashed line directional arrow A. A directional arrow B indicates the long axis and forward direction of airframe 202. A vibration sensor 304, such as an accelerometer, is mounted to tail fin 302 aft of tail rotor gear box 306. Vibration sensor 304 is oriented to detect movement of vertical fin 302 back and forth along the long axis of tail fin 302, as indicated by directional arrow A. In the prototype, vibration sensor 304 is a 15 VDC model 7290A-10 accelerometer made by Endevco. A wide variety of available vibration sensors based on a number of different technologies, including piezoelectric, capacitance, null-balance, strain gage, resonance beam, piezoresistive and magnetic induction may be employed in alternative embodiments. The analog signal from vibration sensor 304 is carried by a shielded cable (not illustrated), preferably along production aircraft cable runs inside the tail drive shaft covers. The cable then proceeds inside the tail and aft cabin in the overhead and forward to cockpit 208. In alternative embodiments, a wireless or fiber optic link may be employed and signals from the vibration sensor 304 may be digital.

Figure 4:
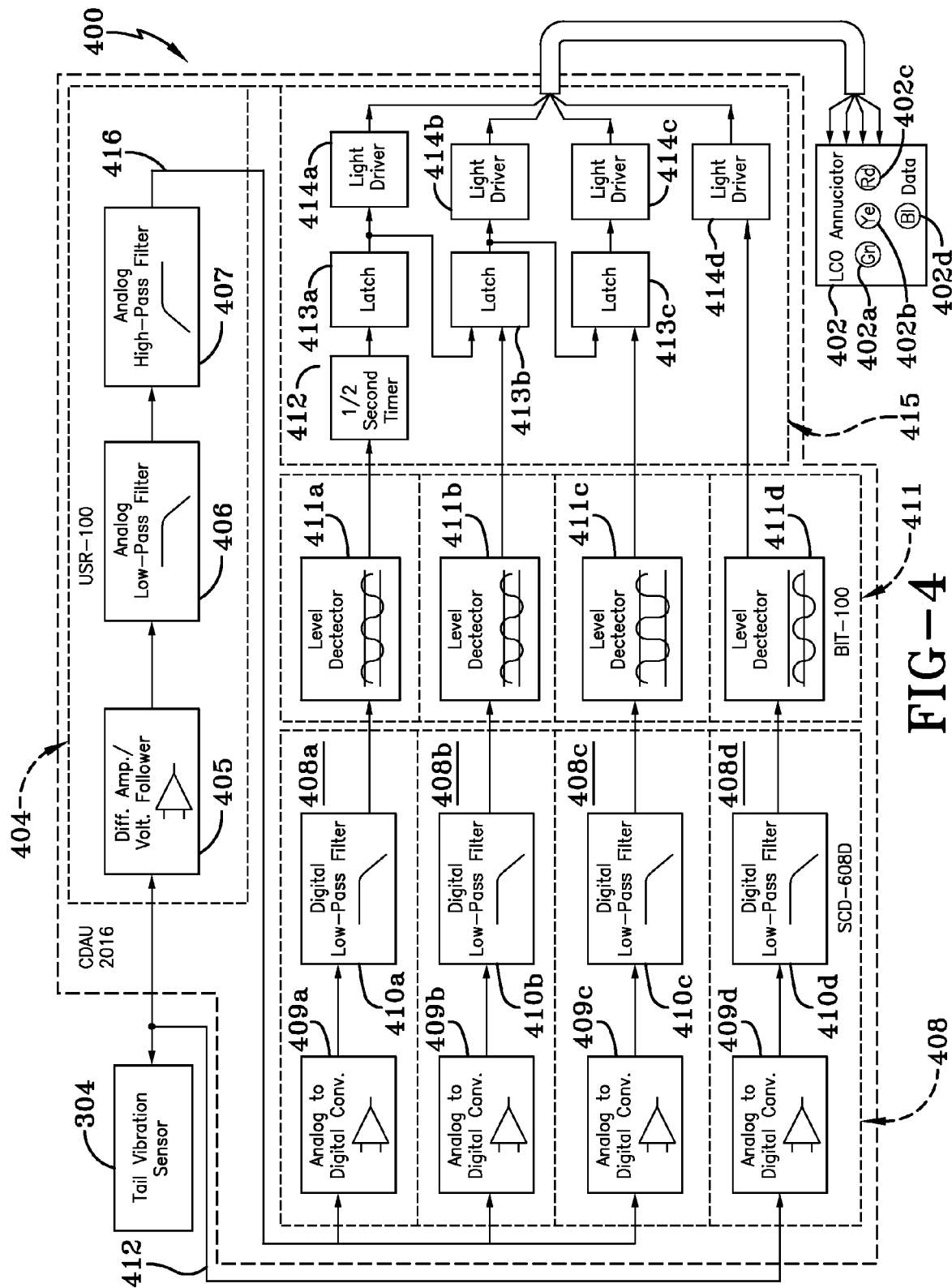
FIG. 4 is a simplified block diagram of an embodiment of a system for alerting an aircrew to unsafe vibration levels, according to the present invention.

FIG. 4 shows a block diagram of an LCO signal conditioning and logic unit 400 which receives and processes signals from vibration sensor 304 and provides LCO status signals for a display 402 positioned on the helicopter instrument panel in cockpit 208. Signal conditioning and logic unit 400 includes a first stage signal conditioner 404 to band limit and buffer the analog signal from accelerometer 304 before digitization. First stage signal conditioner 404 includes a voltage follower/buffer amplifier 405, a low pass analog filter 406 and a high pass analog filter 407. In the prototype, voltage follower/buffer amplifier 405, low pass analog filter 406 and high pass analog filter 407 are implemented on a USR-100 manufactured by Teletronics Technology Corporation. Low pass analog filter 406 is preferably a 6-pole Butterworth filter with a 3 dB cutoff frequency $F_c$ of 21 Hz such that frequencies below 15 Hz pass essentially unattenuated (less than −0.09 dB reduction in gain) and higher frequencies, which may cause aliasing and ringing in downstream stages, are attenuated. The output of low pass filter 406 is coupled to the input of high-pass analog filter 407 which has an $F_c$ of 7.14 Hz. High pass analog filter 407 is preferably a 6-pole Butterworth filter and has a passband above 10 Hz with less than −0.09 dB reduction in gain. High pass filter 407 functions to filter out low frequency signals from accelerometer 304 below 10 Hz, including a DC component representing the background gravitational force, low frequency noise from bumps encountered while the aircraft is taxiing as well as airframe modes below 10 Hz. In the prototype, first stage signal conditioner 404 is implemented on a Common Airborne Instrumentation System (CAIS) Data Acquisition Unit (CDAU), TTC M/N CDAU-2016, manufactured by Teletronics Technology Corporation.

Figure 5:
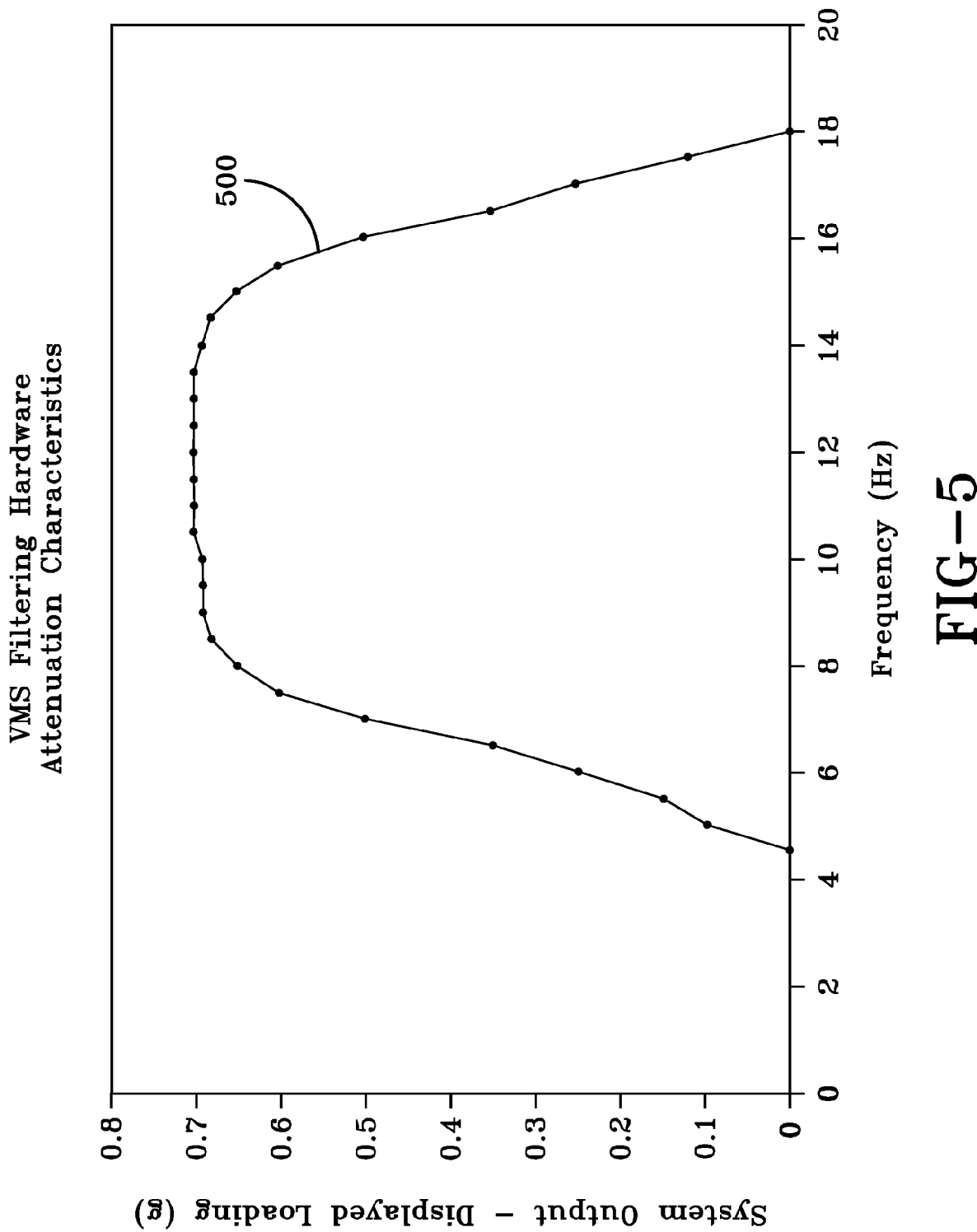
FIG. 5 shows system output-frequency graph of the overall pass band of a signal conditioning and logic unit in an embodiment of a system for alerting an aircrew to unsafe vibration levels according to the present invention.

The filtered output 416 of first stage signal conditioner 404 is coupled into a low pass digital filter unit 408 having multiple channels 408a-d, which include analog to digital converter stages 409a-d and low pass filter stages 410a-d. Sampling in the prototype is performed by a four channel 12 bit analog to digital (A/D) with $f_s$ of 127 Hz. The inputs of analog to digital converters 409a-c are coupled to the output 416 of filter unit 407. The input of analog to digital converter 408d is coupled to the unfiltered output 412 of vibration sensor 304. Digital filters 410a-d are preferably finite impulse response (FIR) filters with 120 taps, 8× oversampling and $f_s$ of 127 Hz. Digital filters 410a-d have an $F_c$ at 15.88 Hz and essentially no attenuation at frequencies below 14.82 Hz. Digital filters 410a-d are designed with sharp cut off characteristics to attenuate vibratory interference that is close to the frequencies of an LCO, such as main rotor and tail rotor blade passing frequencies, which occur at about 16.2 and 17.8 Hz, respectively. Digital filter unit 408 is implemented in the prototype system on an SCD-608D-2 signal conditioning card manufactured by Teletronics Technology Corporation. The overall passband of the Signal conditioning and logic unit 400 is shown by a curve 500 plotted in FIG. 5.

The data output from digital filter unit 408 is monitored by a level detector 411 having four channels 411a-d. Channel 411a is configured to provide an indication (i.e., an output signal) whenever the filtered data from vibration sensor 304 indicates that a 0.7 g level has been detected. Since an LCO is known to occur at a frequency of between 10 and 15 Hz, the indication from level detector 408 is configured to persist for at least ½ of the period of the lowest frequency of interest, i.e., 10 Hz.

The outputs from level detector 411 are coupled to a logic stage 415 which includes a timer circuit 412, latches 413a-c and light drivers 141a-d. The output from level detector channel 411a is coupled to timer circuit 412 which, in turn, provides an indication when the indication from level detector 411a persists for 0.5 seconds or more. Timer 412 may be adjusted to a shorter or longer period in alternative embodiments. The output of timer 412 is coupled to a latch 413a which is coupled to light driver 414a.

Level detector channel 411b is configured to provide an indication whenever the signal from digital low pass filter channel 408b exceeds a magnitude of 2 g's. The output of latch 413a and the output of level detector 411b are coupled to the input of latch 413b. The output of latch 413b is coupled to light driver 414b.

Level detector channel 411c is configured to provide a indication whenever the signal from digital low pass filter channel 408c exceeds a magnitude of 3.5 g's. The output of latch 413b and the output of level detector channel 411c are coupled to the input of latch 413c which in turn is coupled to light driver 414c. Level detector 411d is configured to provide a indication whenever the signal from digital low pass filter channel 408d exceeds 2.5 volts. The output of level detector 411d is coupled to light driver 414d.

The outputs from light drivers 414a-d are coupled to an LCO annunciator/indicator unit 402 which is positioned in the cockpit where it is easily seen by both pilots. LCO annunciator unit 402 includes four display lights 402a-d. The first three lights 402a-c indicate LCO events and are arranged in a row in order of severity from left to right and include, a green indicator light 402*a* to indicate detection of the least severe LCO event, a yellow indicator light 402*b* to indicate detection of a moderately severe LCO event, and a red indicator light 402*c* to indicate that a severe LCO event has been detected. A blue indicator light 402*d* is positioned below the row of lights to indicate that the data may be relied upon by the aircrew. In alternative embodiments, audible alerts may be provided in addition to or as replacements for one or more indicator lights.

Operation of the system will now be described. As noted, signal 412 from vibration sensor 304, which is not processed by first stage signal conditioner 404, is monitored by level detector channel 411*d* for the presence of the DC bias voltage from the background gravity field which will always exist when vibration sensor 304 is powered up and working properly. Indicator light 402*d* will be illuminated by light driver 414*d* as long as good data is being received from vibration sensor 304. The light will not illuminate if there is no power to the instrumentation system, no power to the accelerometer, or the accelerometer fails to return a DC biased signal.

Signal 416, which is processed by first stage signal conditioner 404, will be monitored by signal conditioning and logic unit 400 to check for three levels of vibration. The first level is currently set in the prototype to indicate whenever an oscillating vibration maximum amplitude reaches ±0.7 G's. This indication is provided by level detector channel 411*a* and initiates timer 412. Indicator light 402*a* (green) of annunciator unit 402 will illuminate if the vibration maximum amplitude remains at 0.7 Gs or greater for at least 0.5 seconds and will remain illuminated via latch 413*a*. Only if indicator light 402*a* (green) has been illuminated, may second and third levels of detection circuitry be enabled. Indicator light 402*b* (yellow) light will illuminate when the filtered signal reaches ±2.0 G's. Indicator light 402*c* (red) will illuminate when the signal reaches ±3.5 G's.

Latches 413*a-c* keep indicator lights 402*a*, 402*b* and 402*c* (green, yellow, and red) lit once they have been illuminated until the aircraft is powered down. Both the filtered and unfiltered signals from vibration sensor 304 are preferably recorded continuously. A flag or other indication preferably will be set and recorded in the data stream every time the filtered signal transitions above each of the three data levels to facilitate post-flight analysis.

CONCLUSION

Although the present invention has been described in considerable detail with reference to certain embodiments hereof, it will be clear to one skilled in the art that the above embodiments may be altered in many ways without departing from the invention. Accordingly, the spirit and scope of the appended claims should not be limited to the description of the embodiments contained herein.

What is claimed is:

1. A system to detect a limit cycle oscillation event in a rotary wing aircraft, comprising:
    a vibration sensor that outputs a signal to indicate vibration in a tail mast of the aircraft;
    a filter to limit the signal output from the sensor to a predetermined frequency range in which they limit cycle oscillation occurs; and
    a first switch to provide a first signal when the filtered signal output from the sensor exceeds a first predetermined amplitude for a predetermined duration;
further comprising, a second switch to provide a second signal after the first switch has provided the first signal and the filtered signal output from the sensor has exceeded a second predetermined amplitude greater than the first predetermined amplitude.

2. The system according to claim 1 further comprising, a third switch to provide a third signal after the second switch has provided the second signal and the filtered signal output from the sensor has exceeded a third predetermined amplitude greater than the second predetermined amplitude.

3. The system according to claim 1 wherein the second predetermined amplitude is about 2.0 g's.

4. The system according to claim 2 wherein the third predetermined amplitude is about 3.5 g's.

5. The system according to claim 2 wherein each of the first, second and third signals activate an indicator in the cockpit.

6. The system according to claim 2 wherein each of the first, second and third signals are configured to persist until the aircraft is powered down.

7. The system according to claim 1 wherein the filter to limit the signal output from the sensor to a predetermined frequency range comprises attenuating vibratory interference from main rotor and tail rotor blade passing frequencies wherein the filter to limit the signal output from the sensor to a predetermined frequency range comprises attenuating vibratory interference from main rotor and tail rotor blade passing frequencies, wherein the filter comprises a low pass element having a 3 dB frequency of about 21 Hz and a high pass element having a 3 dB frequency of about 7 Hz.

8. The system according to claim 7 wherein the predetermined frequency range of the filter is between about 10 and 15 Hz with less than approximately −0.9 dB reduction in gain.

9. A system to detect a limit cycle oscillation in a rotary wing aircraft, comprising:
    a vibration sensor that outputs a signal to indicate vibration in a tail mast of the aircraft;
    a filter to limit the signal output from the sensor to a predetermined frequency range;
    a first switch to provide a first signal when the filtered signal output from the sensor exceeds a first predetermined amplitude for a predetermined duration;
    a second switch to provide a second signal after the first switch has provided the first signal and the filtered signal output from the sensor has exceeded a second predetermined amplitude greater than the first predetermined amplitude; and
    a third switch to provide a third signal after the second switch has provided the second signal and the filtered signal output from the sensor has exceeded a third predetermined amplitude greater than the second predetermined amplitude; and each of the first, second, and third signals activate an indicator in a cockpit area of the aircraft to provide a warning to an aircrew to indicate detection of a limit cycle oscillation event.

10. The system according to claim 9 wherein the first predetermined amplitude is about 0.7 g's, the predetermined duration is about 0.5 seconds, the second predetermined amplitude is about 2.0 g's, the third predetermined amplitude is about 3.5 g's, the predetermined frequency range of the filter is between about 10 and 15 Hz with less than approximately −0.9 dB reduction in gain.

11. The system according to claim 9 wherein the warning indicates severity of the limit cycle oscillation event.

* * * * *